(12) United States Patent
Luecke

(10) Patent No.: US 11,510,170 B2
(45) Date of Patent: Nov. 22, 2022

(54) COLLABORATING SENSOR ARRAY AND METHOD THEREFOR

(71) Applicant: BENCHMARK ELECTRONICS, INC., Scottsdale, AZ (US)

(72) Inventor: Jim Luecke, Tempe, AZ (US)

(73) Assignee: Benchmark Electronics, INC., Tempe, AZ (US)

(*) Notice: Subject to any disclaimer, the term of this patent is extended or adjusted under 35 U.S.C. 154(b) by 1004 days.

(21) Appl. No.: 16/229,375

(22) Filed: Dec. 21, 2018

(65) Prior Publication Data
US 2019/0208483 A1 Jul. 4, 2019

Related U.S. Application Data

(60) Provisional application No. 62/577,566, filed on Oct. 26, 2017.

(51) Int. Cl.
H04W 4/00 (2018.01)
H04W 64/00 (2009.01)
(Continued)

(52) U.S. Cl.
CPC ............ *H04W 64/003* (2013.01); *G01S 5/22* (2013.01); *H04L 45/126* (2013.01);
(Continued)

(58) Field of Classification Search
CPC ... H04W 28/04; H04W 72/04; H04W 72/042; H04W 88/08; H04W 64/003; H04W 8/005; H04W 16/18; H04W 52/0206; H04W 56/002; H04W 64/00; H04W 74/02; H04W 74/0816; H04W 88/184; H04W 72/0446;
(Continued)

(56) References Cited

U.S. PATENT DOCUMENTS 8,239,856 B2 * 8/2012 Bull ........................ G06F 8/61
717/121
8,799,322 B2 * 8/2014 deMilo ................ G06F 16/122
707/800
(Continued)

FOREIGN PATENT DOCUMENTS

KR 101539204 7/2015
KR 101622040 6/2016

OTHER PUBLICATIONS

Fusion solution for soldier wearable gunfire detection systems https://www.spiedigitallibrary.org/conference-proceedings-of-spie/8388/838802/Fusion-solution-for-soldier-wearable-gunfire-detection-systems/10.1117/12.924733.short?SSO=1 Proceedings vol. 8388, Unattended Ground, Sea, and Air Sensor Technologies and Applications XIV; 838802 May 24, 2012.

(Continued)

*Primary Examiner* — Phuongchau Ba Nguyen
(74) *Attorney, Agent, or Firm* — Jeffrey D. Moy; Weiss & Moy, PC

(57) ABSTRACT

A method for forming a collaborative wireless sensor array comprising: connecting a plurality of wireless sensor nodes together, wherein each of the plurality of wireless sensor nodes wirelessly communicate with one another; collecting data by the plurality of wireless sensor nodes; forming metadata on the data collected by each of the plurality of wireless sensor nodes; sharing the data and metadata with the plurality of wireless sensor nodes; and fusing the data and metadata to perform a task.

16 Claims, 5 Drawing Sheets

(51) Int. Cl.
*H04W 74/08* (2009.01)
*H04W 74/02* (2009.01)
*H04W 8/00* (2009.01)
*H04W 88/18* (2009.01)
*G01S 5/22* (2006.01)
*H04W 56/00* (2009.01)
*H04L 45/12* (2022.01)
*H04W 16/18* (2009.01)
*H04W 52/02* (2009.01)
*H04W 72/04* (2009.01)
*H04W 84/18* (2009.01)

(52) U.S. Cl.
CPC ........... *H04W 8/005* (2013.01); *H04W 16/18* (2013.01); *H04W 52/0206* (2013.01); *H04W 56/002* (2013.01); *H04W 64/00* (2013.01); *H04W 74/02* (2013.01); *H04W 74/0816* (2013.01); *H04W 88/184* (2013.01); *H04W 72/0446* (2013.01); *H04W 84/18* (2013.01)

(58) Field of Classification Search
CPC .... H04W 84/18; H04L 5/0007; H04L 45/126; G01S 5/22; Y02D 30/70
See application file for complete search history.

(56) References Cited

U.S. PATENT DOCUMENTS

| | | | | |
|---|---|---|---|---|
| 9,900,742 | B1 * | 2/2018 | Thoresen | H04W 4/029 |
| 10,084,835 | B1 * | 9/2018 | Brown | H04L 65/65 |
| 10,713,591 | B2 * | 7/2020 | Gangadharappa | G06N 5/04 |
| 2008/0008044 | A1 | 1/2008 | Patterson et al. | |
| 2008/0069008 | A1 * | 3/2008 | Park | H04W 64/00 370/254 |
| 2008/0165621 | A1 | 7/2008 | Fisher et al. | |
| 2009/0307228 | A1 * | 12/2009 | Park | H04L 67/125 |
| 2011/0246402 | A1 | 10/2011 | Burman | |
| 2012/0212399 | A1 | 8/2012 | Border et al. | |
| 2012/0275272 | A1 | 11/2012 | Mullen | |
| 2015/0131411 | A1 | 5/2015 | Gudgel et al. | |
| 2015/0172545 | A1 | 6/2015 | Szabo et al. | |
| 2015/0309316 | A1 | 10/2015 | Osterhout et al. | |
| 2015/0350750 | A1 * | 12/2015 | Yun | H04Q 9/00 340/870.07 |
| 2016/0187654 | A1 | 6/2016 | Border et al. | |
| 2016/0209648 | A1 | 7/2016 | Haddick et al. | |
| 2017/0195821 | A1 * | 7/2017 | Lam | H04W 4/70 |
| 2018/0270612 | A1 * | 9/2018 | Thoresen | G01S 1/02 |
| 2019/0066670 | A1 * | 2/2019 | White | G10L 25/84 |
| 2019/0182627 | A1 * | 6/2019 | Thoresen | H04L 67/22 |
| 2020/0211554 | A1 * | 7/2020 | White | G10L 15/1815 |

OTHER PUBLICATIONS

PinPoint Gunshot Detection System—Dismount Publication Date: Feb. 5, 2013.
NEON Squad Tracker https://www.trxsystems.com/squad-tracker.html.
Wireless Sensor Networks: Concepts, Applications, Experimentation and Analysis Author: Hossam Mahmoud Ahmad Fahmy Published Date: Mar. 2, 2016.

* cited by examiner

COLLABORATING SENSOR ARRAY AND METHOD THEREFOR

RELATED APPLICATIONS

This patent application is related to U.S. Provisional Application No. 62/577,566 filed Oct. 26, 2017, entitled "INTERNET OF THINGS (IOT) ARCHITECTURE" in the name of Hiep Truong, Kevin Nguyen, Ron Hobbs, and Jim Luecke, and which is incorporated herein by reference in its entirety. The present patent application claims the benefit under 35 U.S.C § 119(e).

TECHNICAL FIELD

The present application relates generally to the technical field of sparse sensor array, and more specifically, to the technical field of a dynamic sparse sensor array wherein individual wireless sensors cooperatively work together to form a collaborating array of sensors that fuses available data together.

BACKGROUND

Sensor array systems generally include multiple sensors arranged in an array. In general, each of the sensors measures/monitors a physical quantity and converts the physical quantity into a representative signal. By acquiring data from an array of sensors, a sensor array system may be used to determine information about a signal of interest, such as a direction-of-arrival, and about the source, such as the location.

In a static sensor array system, the positions of the wireless sensor nodes are known. Location information is necessary to provide a physical context to a sensor's readings. For example, in many applications such as environmental monitoring, sensor readings without knowledge of the location where the readings were obtained are meaningless. Location information is further necessary for services such as intrusion detection, inventory and supply chain management, and surveillance.

However, in a dynamic sensor array system, one or more of the wireless sensor nodes may move. Thus, the positions of the wireless sensor nodes that have moved may not be known. As stated above, without knowledge of the location where the readings were obtained, the wireless sensor data may be meaningless. The lack of location information may be especially problematic in Radio Frequency (RF) beamforming applications. Further, in beamforming applications, the wireless sensor nodes may need to be properly synchronized. While the wireless node may have its own internal clock and its own notion of time, these clocks can easily drift anywhere from microseconds to seconds in a small duration of time, accumulating significant errors over time. These clock drifts potentially pose serious problems to applications that depend on a synchronized notion of time.

In dynamic sensor array systems, many applications may need for the local clocks of the wireless sensor nodes to be synchronized, requiring various degree of precision to coordinate their operations and collaborate to achieve complex sensing tasks. As stated above, internal clocks can easily drift anywhere from microseconds to seconds in a small duration of time, accumulating significant errors over time. Further, in dynamic sensor array systems, the wireless sensor nodes may move making their position unknown. As stated above, the locations of the wireless sensors need to be known so that the wireless sensor data has some type of physical context.

Therefore, it would be desirable to provide a system and method that overcomes the above. The system and method would allow for a dynamic sensor array system wherein the wireless sensors may be able to corroborate with one another to fuse available data even when one or more of the wireless sensors are mobile.

SUMMARY

In accordance with one embodiment, a method for forming a collaborative wireless sensor array is disclosed. The method for forming a collaborative wireless sensor array comprises: connecting a plurality of wireless sensor nodes together, wherein each of the plurality of wireless sensor nodes wirelessly communicate with one another; collecting data by the plurality of wireless sensor nodes; forming metadata on the data collected by each of the plurality of wireless sensor nodes; sharing the data and metadata with the plurality of wireless sensor nodes; and fusing the data and metadata to perform a task.

In accordance with one embodiment, a method for forming a collaborative wireless sensor array is disclosed. The method for forming a collaborative wireless sensor array comprises: connecting a plurality of wireless sensor nodes together, wherein each of the plurality of wireless sensor nodes wirelessly communicate with one another for synchronization and localization; collecting data by the plurality of wireless sensor nodes; forming metadata on the data collected by each of the plurality of wireless sensor nodes; sharing the data and metadata with the plurality of wireless sensor nodes; and fusing the data and metadata to perform a task, wherein fusing the data and metadata comprising weighting the data and metadata.

In accordance with one embodiment, a sensor array system is disclosed. The sensor array system has a gateway node. The gateway node transmits a timing signal. A plurality of wireless sensor nodes are provided. The plurality of wireless sensor nodes are synchronized with the gateway node and form wireless clusters for localization. The plurality of wireless sensor nodes collect data, wherein metadata is formed on the data collected, the metadata shared and fused together for analysis.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a wireless sensor array wherein the wireless sensor nodes provide metadata to the data recorded and stored. The metadata helps the end user to determine the value of the data collected and how to best use the data collected. The data and metadata may be stored and fused together even when one or mom of the wireless sensors are mobile. The fusion of data may be dependent on the wireless sensor nodes abilities to be synchronized, know their relative position and other metrics. The collaboration of data may allow for the wireless sensor array to become a virtual sensor. The wireless sensor array may be able to perform sound source localization and classification, as well as acoustic beamforming to an identified location or as a scanning pattern, chemical/biological/electromagnetic picture of treat extent and profile, multi-sensor image fusion and the like.

Figure 1:
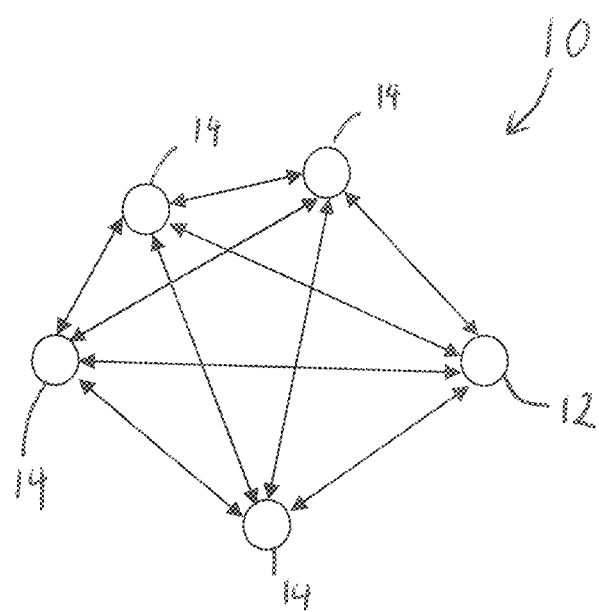
FIG. 1 is an exemplary block diagram of a collaborating sensor array system in accordance with one aspect of the present application.

Referring to FIG. 1, a wireless sensor array network 10 may be seen. The wireless sensor array network 10 may be comprise of a gateway/coordinator node 12 and a plurality of wireless sensor nodes 14. In accordance with one embodiment, the wireless sensor nodes 14 may be used to monitor, record and/or transmit data. For example, the wireless sensor nodes 14 may be used to monitor, record, and/or transmit noise data, vibration data, pollutant data, and/or other external sensory data. The data that is monitored and recorded by the wireless sensor nodes 14 may then be sent to the gateway/coordinator node 12.

In accordance with one embodiment, the wireless sensor array network 10 may be designed to minimize cost and power usage. To minimize cost and power usage, the wireless sensor nodes 14 may be configured not to have any timing information. Thus, the wireless sensor nodes 14 may be configured not to have an internal timing source such as a signal clock generator and/or GPS receiver.

The gateway/coordinator node 12 may be wirelessly coupled to one or more of the wireless sensor nodes 14. The gateway/coordinator node 12 may be used to establish a local time for the system 10. The gateway/coordinator node 12 may do this by sending timing information as well as other data to one or more of the wireless sensor nodes 14. In accordance with one embodiment, the gateway/coordinator node 12 may transmit timing and/or data signals to the wireless sensor nodes 14 in the UWB frequency range. For example, in the unlicensed frequency bands of 3 GHz to 6 GHz.

Figure 2:
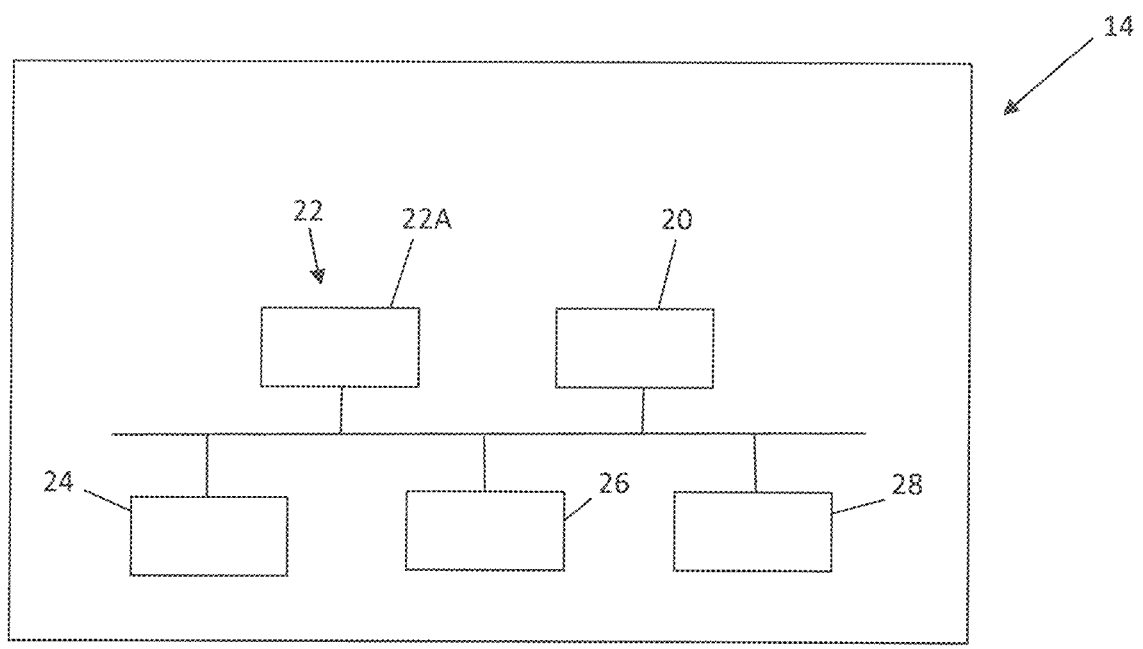
FIG. 2 is an exemplary block diagram of a wireless sensor node used in the collaborating sensor array system of FIG. 1 in accordance with one aspect of the present application.

Referring to FIG. 2, a block diagram of one embodiment of wireless sensor node 14 may be seen. The wireless sensor node 14 may have a sensor 20. The sensor 20 may be used to collect sensory data. For example, the sensor 20 may be used to collect noise data, vibration data, pollutant and/or other chemical/biological data, and/or other external sensory data.

The wireless sensor node 14 may have a receiver/transmitter 22. The receiver/transmitter 22 may be used to send and receive data to and from the wireless sensor node 14. In accordance with one embodiment, the receiver/transmitter 22 may be an Ultra-Wideband (UWB) receiver/transmitter 22A. In this embodiment, the receiver/transmitter 22 may operate in the unlicensed frequency bands of 3 GHz to 6 GHz.

The wireless sensor node 14 may have memory 24. The memory 24 may be used to store sensory data from the sensor 20. In some embodiments, sensory data could be transmitted elsewhere for storage via the receiver/transmitter 22. The memory 24 may also be used as a computer-readable storage medium containing instructions for infrastructure protocols, meta-data processing and collaborating of duties as will be disclosed below. Such instructions can be executed by a processor 26. The wireless sensor node 14 may be powered by a power source 28. The power source 28 may be a battery or similar device.

Figure 3:
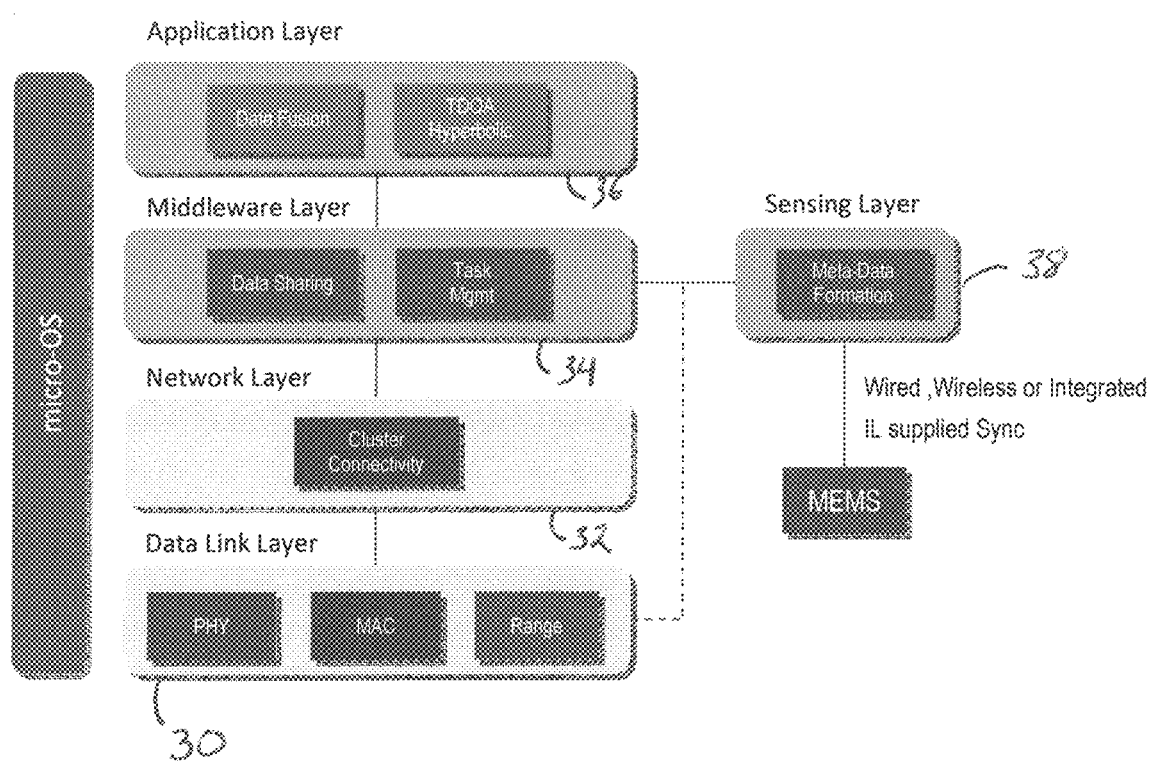
FIG. 3 is an exemplary block diagram showing a software architecture of the processor in FIG. 2 in accordance with one aspect of the present application.

Referring to FIG. 3, a diagram showing a software architecture of the processor 26 of the wireless sensor node 14 may be seen. The processor 26 may be configured to have a sensing layer 38. The sensing layer 38 may be used to form the metadata on the data collected. In general, metadata is information about data, and describes basic characteristics of the data, such as who created the data, what the data file contains, when the data were generated, where the data were generated, why the data were generated and how the data were generated. In the wireless sensor array network 10, the metadata may include, but is not limited to: task centric static information, such as background information on the task and overall structure/objective of the task; wireless sensor static information, such as the type and location of each wireless sensor node if the wireless sensor node is static; wireless sensor dynamic information, such as serviceability of the wireless sensor i.e. whether it is deployed, stored, broken etc., wireless sensor node measurement readings, and location information if the wireless sensor node is mobile.

The processor 26 may be configured to have a data link layer 30. The data link layer 30 may have a Physical (PHY) layer and Media Access Control (MAC) layer. The PHY layer may be used to converts data between a "clean" clocked digital form which is only suitable for very-short-distance communication, and an analogue form which is suitable for longer range transmission. The MAC layer receives bits from the PHY, detects packet boundaries, assembles bits into packets, and validates them. It also takes packets of data that are loaded into it and converts them to streams of bits which are fed to the PHY. Typically, a MAC will include some logic to delay transmissions until the line is clear, and retry transmissions which are interrupted by collisions, but it will not include logic to listen for acknowledgments nor retry packets which are not garbled by collisions but aren't acknowledged either.

In order to perform certain task, the wireless sensor array network 10 may need for the wireless sensor nodes 14 to be synchronized. Further, in the wireless sensor array network 10, the wireless sensor nodes 14 may be dynamic. Thus, the wireless sensor nodes 14 may be mobile and move from position to position. As stated above, without knowledge of the location, the wireless sensor data collected may be meaningless. Further, the lack of location information may be especially problematic in Radio Frequency (RF) beamforming applications.

Because of the above issues, the processor 26 may be configured with a network layer 32. The network layer 32 may allow the wireless sensor nodes 14 to connect and communicate with one another. By connecting and communicating together, the wireless sensor nodes 14 may all be synchronized to a common timing signal and may perform ranging with different wireless sensor nodes for localization.

Different techniques may be used for synchronization and localization. For example, the techniques disclosed in application Ser. No. 15/982,734, filed May 17, 2018, entitled SYNCHRONIZATION AND TIME TRANSFER IN WIRELESS NETWORKS AND METHOD THEREFOR and application Ser. No. 16/041,047, filed Jul. 20, 2018, entitled MESH RANGING AND NETWORK MESSAGE AND SLOT STRUCTURE FOR AD-HOC NETWORKS AND METHOD THEREFOR both of which are commonly owned by the current Applicant and which is hereby incorporated by reference may be used.

The processor 26 may be configured with a middleware layer 34. The middleware layer 34 may be used to share the collected metadata with the other wireless sensor nodes 14 and the gateway/coordinator node 12. The middleware layer 34 may also be used for task management. Task management may include, but is not limited to, the planning, testing, tracking, and reporting of a particular task through completion. The task management module may help the wireless sensor array network 10 achieve the task through the collaboration and sharing of the task and metadata. For example, if the task is to track a moving target, by sharing the task, certain wireless sensor nodes 14 not within a predefined distance of the target may be put to sleep in order to save power. As the target moves, wireless sensor nodes 14 in the direction of the moving target may be awaken while the wireless sensor nodes 14 in the opposing direction away from the moving target may be put to sleep.

The processor 26 may be configured with an application layer 36. When the wireless sensor nodes 14 collects the different metadata, the metadata may be fused together and analyzed. This may allow the wireless sensor array network 10 to gain the maximum benefit from the available metadata collected from the different wireless sensor nodes 14. The collaboration and fusion of the metadata may make the whole greater than the sum of the parts as may be shown below. The collaboration and fusion of the metadata may allow for improved geolocation. Further, by having the wireless sensor nodes 14 collaborate together, the wireless sensor array network 10 may be able to beamform thereby creating a more capable virtual sensor. It should be noted that the collaboration and fusion of the metadata is generally dependent on the ability of the wireless sensor nodes 14 to be properly synchronized and the position of the wireless nodes 14 are known.

Figure 4A:
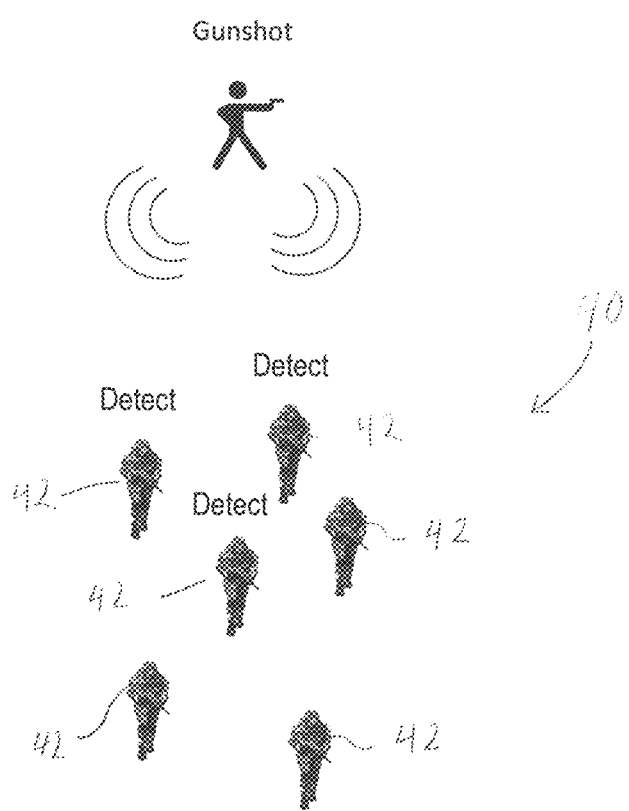
FIG. 4A is a prior art sensor array in accordance with one aspect of the present application.

Referring to FIG. 4A-4D, one may see how the collaboration and fusion of the metadata may make the whole greater than the sum of the parts. FIG. 4A may depict a prior art sensor array 40 having a plurality of sensor nodes 42. In this embodiment, the sensor array 40 may be used for sound detection. Since the sensor nodes 42 are not interlinked and share information, the sensor nodes 42 may only provide sound detection information. Thus, each sensor node 42 may provide data on the sound level detected.

Figure 4B:
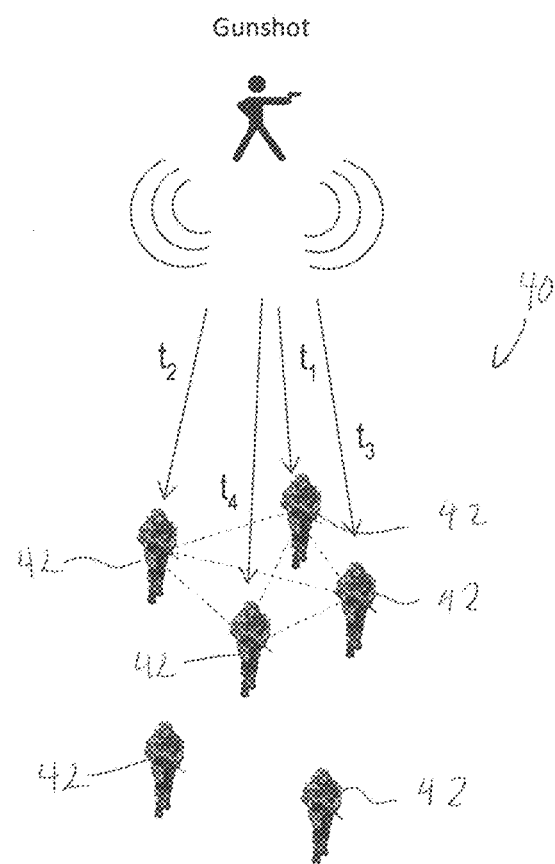
FIG. 4B is an exemplary block diagram of the collaborating sensor array system of FIG. 1 used for sound source localization in accordance with one aspect of the present application.

However, in the embodiment shown in FIG. 4B, the wireless sensor array 40 is a collaborative array. The wireless sensor nodes 42 may be wirelessly connected to one another in order to share the metadata recorded and stored. Since the wireless sensor nodes 42 may be connected, the wireless sensor nodes 42 may be synchronized and their relative locations known as disclosed above.

Figure 4C:
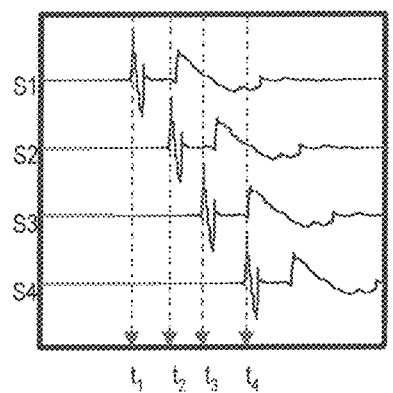
FIG. 4C is an exemplary timing diagram for the embodiment depicted in FIG. 3B in accordance with one aspect of the present application.
Figure 4D:
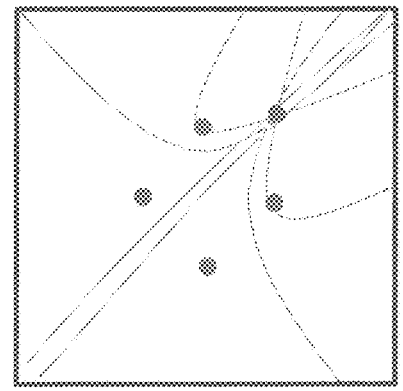
FIG. 4D is an exemplary timing diagram for the embodiment depicted in FIG. 3B in accordance with one aspect of the present application.

Since the wireless sensor nodes 42 may be synchronized and their relative position known, each wireless sensor node 42 may record the time the sound (gunshot in the present embodiment) is detected as may be seen in FIG. 4C. Based on the time the sound signals were received by the different wireless sensor nodes 42 and the known position of each wireless sensor node 42, using Time Difference of Arrival (TDOA) techniques, one may identify an estimated location of the of the source of the sound as shown in FIG. 4D.

During the fusion of the metadata, the wireless sensor array 40 may have redundant information. The redundant information may need to be weighted. Different quality metrics may be used to weight the measurements. For example, in the embodiment shown in FIG. 4B, the quality metrics may be based on the signal level received, geometrically on the location of the wireless sensor nodes (i.e., if one or more of the wireless sensor nodes are too close together, etc.), the type of wireless sensor node 42 being used, if the wireless sensor node is working properly, and the like. This type of information should be weighted to try and obtain/calculate the best result.

The foregoing description is illustrative of particular embodiments of the application, but is not meant to be a limitation upon the practice thereof. The following claims, including all equivalents thereof, are intended to define the scope of the application.

What is claimed is:

1. A method for forming a collaborative wireless sensor array comprising:
   connecting a plurality of wireless sensor nodes together, wherein connecting the plurality of wireless sensor nodes together comprises synchronizing the plurality of wireless sensor nodes, each of the plurality of wireless sensor nodes wirelessly communicate with one another;
   collecting data by the plurality of wireless sensor nodes;
   forming metadata on the data collected by each of the plurality of wireless sensor nodes, wherein forming metadata comprises:
   adding task centric static information to the data;
   adding wireless sensor node static information to the data; and
   adding wireless sensor node dynamic information to the data;
   sharing the data and metadata with the plurality of wireless sensor nodes; and
   fusing the data and metadata to perform a task.

2. The method of claim 1, wherein connecting the plurality of wireless sensor nodes together comprises performing localization for the plurality of nodes.

3. The method of claim 1, wherein forming metadata comprises:
   adding background information about the task to the data;
   adding a type and status of a corresponding wireless sensor node to the data collected by the corresponding wireless sensor node; and
   adding wireless sensor node measurement readings and location information.

4. The method of claim 1, wherein fusing the data and metadata comprising weighting the data and metadata.

5. The method of claim 1, wherein the task is sound source localization.

6. The method of claim 5, comprising performing Time Difference of Arrival (TDOA) procedures.

7. The method of claim 1, wherein the task is beamforming.

8. A method for forming a collaborative wireless sensor array comprising:
   connecting a plurality of wireless sensor nodes together, wherein each of the plurality of wireless sensor nodes wirelessly communicate with one another for synchronization and localization;
   collecting data by the plurality of wireless sensor nodes;
   forming metadata on the data collected by each of the plurality of wireless sensor nodes, wherein forming metadata comprises:
   adding background information about the task to the data;
   adding a type and status of a corresponding wireless sensor node to the data collected by the corresponding wireless sensor node; and
   adding wireless sensor node measurement readings and location information;
   sharing the data and metadata with the plurality of wireless sensor nodes; and
   fusing the data and metadata to perform a task, wherein fusing the data and metadata comprising weighting the data and metadata.

9. The method of claim 8, wherein forming metadata comprises:
   adding task centric static information to the data;
   adding wireless sensor node static information to the data; and
   adding wireless sensor node dynamic information to the data.

10. The method of claim 8, wherein the task is sound source localization.

11. The method of claim 10, comprising performing Time Difference of Arrival (TDOA) procedures.

12. The method of claim 8, wherein the task is beamforming.

13. A sensor array system comprising:
    a gateway node, the gateway node transmitting timing signal; and
    a plurality of wireless sensor nodes, wherein the plurality of wireless sensor nodes are synchronized with the gateway node and formed wireless clusters for localization, the plurality of wireless sensor nodes collecting data, wherein metadata is formed on the data collected, the metadata shared and fused together for analysis, wherein the metadata comprises:
    task centric static information;
    wireless sensor node static information; and
    wireless sensor node dynamic information.

14. The sensor array system in accordance with claim 13, wherein the metadata comprises:
    background information about the task;
    a type and status of a corresponding wireless sensor node; and
    wireless sensor node measurement readings and location information.

15. The sensor array system in accordance with claim 13, wherein fusing the data and metadata comprising weighting the data and metadata.

16. The sensor array system in accordance with claim 13, the task is one of sound source localization or beamforming.

* * * * *